July 31, 1928.
P. F. RAUEN
MILK CAN COVER
1,678,953
Filed June 29, 1926
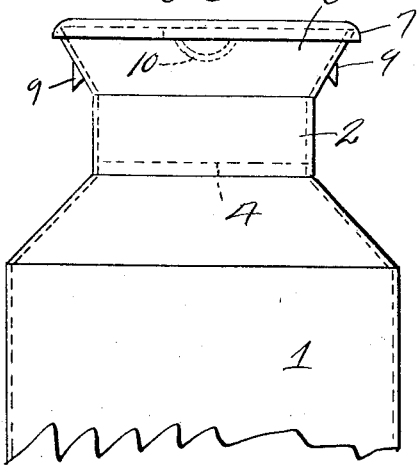
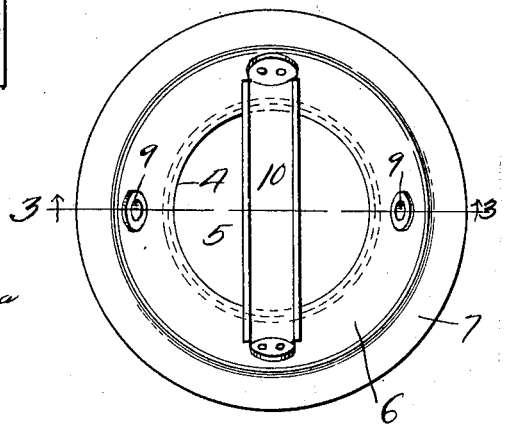
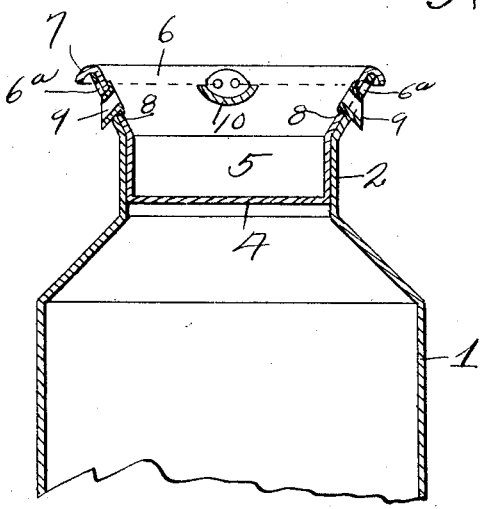
Inventor
Peter F. Rauen
By James W. Martin
Attorney Patented July 31, 1928.

1,678,953

UNITED STATES PATENT OFFICE.

PETER F. RAUEN, OF OMAHA, NEBRASKA.

MILK-CAN COVER.

Application filed June 29, 1926. Serial No. 119,351.

The invention relates to milk can covers and has for its object to provide drainage means in combination with a dished or chambered milk can cover, and through which drainage means water accumulated within the cover will be discharged to opposite sides of the mouth of the milk can, thereby preventing the water which accumulates in the cover from flowing downwardly into the milk can through the sealing wire holes in the cover, which is the present difficulty experienced with milk cans.

A further object is to provide the milk can cover with diverging discharge spouts at opposite sides thereof, which discharge spouts terminate beyond the sides of the milk can mouth, and discharge water from the chamber of the cover when it reaches a predetermined level.

A further object is to provide a milk can cover with diverging discharge spouts at opposite sides thereof, which discharge spouts extend through elongated apertures in the can mouth and discharge beyond the opposite sides of the can mouth, and to proportion said discharge spouts and elongated apertures whereby the cover may be axially removed from the can mouth or axially placed therein without interference by the discharge spouts.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:

Figure 1 is a side elevation of a portion of a milk can and the cover, showing the drainage pipe applied thereto.

Figure 2 is a top plan view of the cover and can.

Figure 3 is a vertical transverse sectional view through the cover and can taken on line 3—3 of Figure 2.

Referring to the drawing, the numeral 1 designates the body of a conventional form of milk can, which body is provided with a neck 2. Disposed within the neck 2 is the cylindrical portion 4 of the cover, which portion 4 has a chamber 5 therein. The upper end of the cylindrical portion 4 of the cover terminates in a flared annular flange 6 which terminates in a downwardly rolled portion 7. It has been found that water accumulates in the chamber 5 of the cover and fills said chamber, which water passes off through the sealing wire holes 6ª and down the outer side of the cover and enters the can 1 around the cylindrical portion 4 of the cover, which is not a water tight fit. This condition is particularly common where the cans of milk are left on railroad platforms or anywhere exposed to weather. To obviate the above difficulty the opposite sides of the flared flange 6 are provided with apertures 8 in which are brazed outwardly and downwardly extending discharge spouts 9, which terminate beyond the opposite sides of the can thereby preventing the water which overflows through the drain pipes 9 from entering the neck of the can as said water is discharged beyond the can. It will be noted that the discharge pipes 9 are spaced from the upper end of the cover, consequently will positively prevent the filling and overflowing of the chamber 5, and at the same time the chamber can be utilized for the transversely disposed handle 10 in the usual manner, and the milk can cover is not varied in construction with the exception of the application thereto of the discharge pipes 9.

From the above it will be seen that drainage means is provided for the chamber of a milk can cover, which means may be easily and quickly applied to a conventional form of cover by simply cutting holes in opposite sides thereof, placing the pipes 9 in position and securing the pipes preferably by brazing the same to the cover.

The invention having been set forth what is claimed as new and useful is:—

The combination with a milk can cover disposed within the neck of a can and having a chamber therein, an upwardly and outwardly flared annular flange carried by said cover, of downwardly and outwardly extending discharge pipes carried by said flange and extending through apertures in the neck and terminating beyond sides of the neck and forming means whereby water above a predetermined level within the chamber of the cover will be discharged beyond the side of the neck, said cover being axially movable from the neck of the can.

In testimony whereof I hereunto affix my signature.

PETER F. RAUEN.